United States Patent [19]

Mulder

[11] Patent Number: 4,893,186
[45] Date of Patent: Jan. 9, 1990

[54] IMAGE PICKUP DEVICE WITH EXPOSURE CONTROL BASED ON PIXEL SAMPLES

[75] Inventor: Hendrik Mulder, Delft, Netherlands

[73] Assignee: B.V. Opische Industrie "De Oude Delft", Delft, Netherlands

[21] Appl. No.: 153,249

[22] Filed: Feb. 8, 1988

[30] Foreign Application Priority Data

Feb. 16, 1987 [NL] Netherlands ............... 8700372

[51] Int. Cl.⁴ ............................... H04N 3/14
[52] U.S. Cl. ..................... 358/213.19; 358/213.29
[58] Field of Search ............ 358/213.19, 213.28, 358/228, 213.29

[56] References Cited

U.S. PATENT DOCUMENTS

| | | | |
|---|---|---|---|
| 4,280,141 | 7/1981 | McCann et al. | 358/213.19 |
| 4,573,077 | 2/1986 | Imai | 358/213.19 |
| 4,743,971 | 5/1988 | Hügli | 358/213.19 |

Primary Examiner—Jin F. Ng
Assistant Examiner—Stephen Brinich
Attorney, Agent, or Firm—Louis E. Marn

[57] ABSTRACT

Image pickup device comprising a matrix having horizontal rows and vertical columns of image pickup elements and having means supplying clock signals to the matrix of pickup elements in order to shift image information in the column direction in the time delay and integration mode. Along each column in image pickup elements at predetermined positions a determination is made of whether the charge at those positions exceeds a limit value. If so, the charge in such image pickup elements is removed completely and integration starts again. From the charge in the last element in a column as well as the number of times charge has been removed it can be deduced what the total charge would have been without removal.

Thus images can be recorded the contrast ratio of which otherwise would exceed the maximum contrast ratio which the image pickup device is capable of recording.

19 Claims, 9 Drawing Sheets

IMAGE PICKUP DEVICE WITH EXPOSURE CONTROL BASED ON PIXEL SAMPLES

The invention relates to an image pickup device comprising a matrix having horizontal rows and vertical columns of image pickup elements, means for supplying clock signals to the matrix of pickup elements in order to shift image information in the column direction in the time-delay-and-integration mode, and means for repeatedly reading the image information out of a column.

In radiography, it is known from the U.S. Pat. No. 4,179,100 that a flat fan-shaped beam of X-rays is directed via a body under examination at an image pickup device consisting of a large number of image pickup elements situated in a line. In this case, each image pickup element receives, optionally after further processing, the radiation which is transmitted through a corresponding part of the body under examination. As further processing, the radiation may be converted, for example before it is picked up by the image pickup device, into visible light in an X-ray detector. In an image pickup device consisting of a large number of image pickup elements situated in a line and having, for example, dimensions of $0.1 \times 0.1$ mm, the exposure time for each image pickup element is extremely short for the normal speeds of scanning a body under examination. As a result of this, the signal/noise ratio of the image obtained is very poor, or to achieve a better signal/noise ratio, the source loading has to be raised to undesirably high levels. In order, nevertheless, to obtain an acceptable signal/noise ratio at a relatively low source loading, it is necessary to use the X-ray source more efficiently than is possible with a fan-shaped beam which has only a thickness the size of one image pickup element.

From the U.S. Pat. No. 4,383,327, it is known that use is made of an image pickup device comprising a matrix having rows and columns of image pickup elements in which the charge which is formed in a particular cycle in a particular image pickup element as a result of the radiation received by said element during said cycle is transferred to an adjacent associated vertical shift register in a read cycle. This takes place for all the image pickup elements in each row during the read cycle. Between the consecutive cycles a relative movement is also brought about between the body and the image pickup device so that during the subsequent cycle, the same part of the body under examination is imaged on the subsequent row of image pickup elements. It is also possible in a manner known per se to combine the function of converting radiation into charge and the function of transporting charge in a vertical CCD shift register. The charge in the shift register keeps in step so that, in this manner, a charge is accumulated during consecutive cycles by consecutive image pickup elements in a column in the associated shift register. The accumulated charge is the sum of the charge which is generated by a specific part (an image point) of the body under examination during the successive cycles. At an end of the columns, a horizontal shift register may be provided for consecutively reading out and delivering the information in sequence from the adjacent columns to an output terminal. The information then always represents, therefore, the summed information of all the image pickup elements in each of the columns for an image point.

This manner of scanning is termed TDI (time delay and integration) and appears to be capable of being applied particularly well in examining bodies by means of X-rays, it being possible for a usable image to be formed despite the fact that each image pickup element generates per se only a very small amount of charge in response to the radiation received. For an extensive discussion of the TDI principle, reference is made to the U.S. Pat. No. 4,383,327.

For the sake of simplicity of the description, the term "image pickup element" is hereinafter understood to mean an element which provides both for the formation of charge when exposed to incident radiation and also for the transport of the charge in the column direction regardless of whether these are physically separate elements or one element with a combined function. If the meaning is exclusively the element which provides for the conversion of radiation into charge, reference will be made to an actual image pickup element.

If a column in a TDI image pickup device contains, for example, m image pickup elements, in the image pickup element in the column which delivers its charge to the horizontal shift register, there will be present in principle a charge which is m times as great as the charge generated by one pickup element during the exposure thereof through a particular image point.

If, however, the charge in an image pickup element in the column exceeds a particular value, for example, because the relevant image point transmits a relatively large amount of radiation, saturation occurs in said image pickup element and in the image pickup elements subsequent thereto in the column. The consequences of said saturation such as crosstalk to adjacent columns, the so-called "blooming", may be converted by providing means which can remove the excess of charge, for example, by providing, in a manner known per se an anti-blooming channel. This has the consequence, however, that the remaining charge in the column is no longer proportional to the radiation transmitted by the relevant image point, as a result of which a reduction of the contrast range occurs in the final X-ray image, which is undesirable in many cases.

The object of the invention is to provide a solution for said problem as a result of which the maximum permissible exposure per image pickup element may be considerably larger without the risk of saturation occurring and to this end provides a device of the abovementioned type in which provision is made for means of determining the amount of charge stored in particular image pickup elements in a column and for means of always removing said charge in said image pickup elements completely if the detected amount exceeds a predetermined limit value.

If, according to the invention, a determination is made of whether the charge in particular image pickup elements in a column exceeds a limit value, it is possible, by a suitable choice of said image pickup elements where such a check takes place, to prevent saturation occurring during the accumulation of charge in the remaining section of the column so that, in principle, the total exposure received by the column can still be deduced from the charge in the last image pickup element in the column, provided, of course, an account is also kept of which section of the column has effectively contributed to the charge signal fed into the horizontal shift register. This is possible as a result of keeping an account of how many times it has been found that the charge exceeded the limit value and the total charge formed at that instant was removed, and of adjusting the final signal as a function thereof by means of a scaling factor.

Even if no account is kept of whether charge has been removed anywhere in the column of image pickup elements, the invention has advantages. The total exposure range achievable in principle of the m image pickup elements is then in fact divided into a number of regions in which the charge is always proportional to the exposure level. As a result of this a form of image eualization is achieved because relatively small differences in each region are still detectable as signal differences while differences between the mean exposure level of the regions are not detectable.

The invention will be explained in more detail below on the basis of an exemplary embodiment with reference to the drawing, in which.

Figure 1:
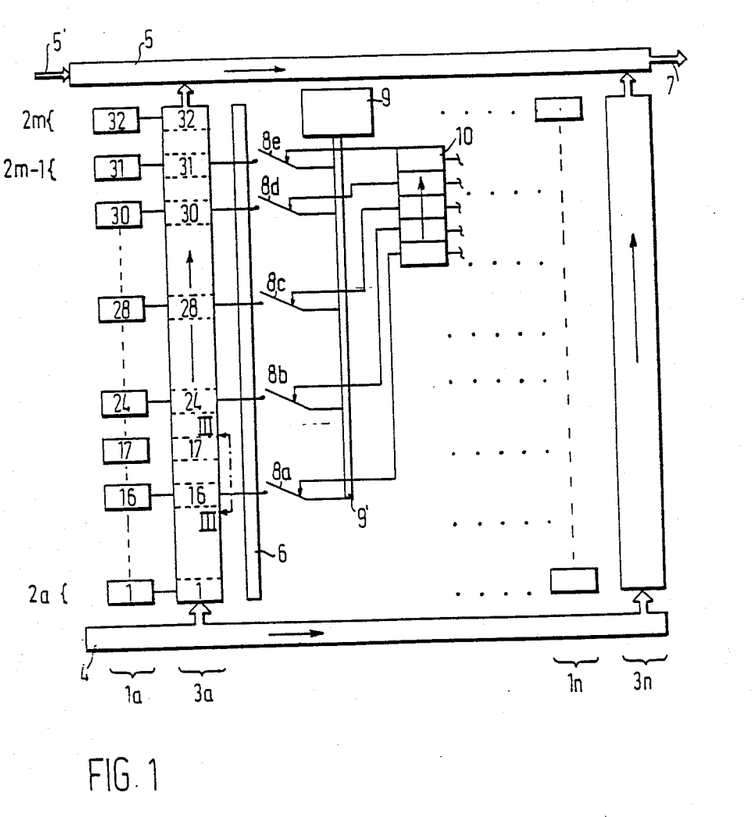
FIG. 1 shows a diagrammatic plan view of a section of an image pickup device according to the invention.

FIG. 1 shows diagrammatically the structure of an image pickup device which is formed on a semiconductor substrate and is equipped to operate according to the TDI principle. The device comprises n columns, 1a-1n respectively, and m rows, 2a-2m respectively of actual image pickup elements. The image pickup device therefore consists of m×n actual image pickup elements. Each of the m image pickup elements of a particular column can be coupled under the control of a read-out gate electrode to a vertical CCD shift register, 3a-3n respectively, associated with said column. Clock signals are fed in a manner known per se via a bus 4 to said shift registers 3a-3n and to the read-out gate electrodes. At the mth row the shift register$ of each column are connected to a horizontal shift register 5 that can also receive clock signals via a bus 5'. The output signal of the horizontal shift register 5 can be removed at an output terminal 7 after which the signal can subsequently be processed further. For the manner in which the charge is transferred from the separate actual image pickup elements, which charge corresponds to radiation received during a particular cycle, to the adjacent vertical shift registers and is moved from there to the horizontal shift register making use of the TDI principle, reference is made to the U.S. Pat. No. 4,383,327.

Attention is drawn to the fact that it is possible in a manner known per se to equip the image pickup device according to FIG. 1 in a manner such that the function of converting radiation into charge and the function of transporting the charge formed in the column direction are combined. In that case, the columns 1a-1n are therefore respectively combined with the columns 3a-3n to form one single column in each case.

In the description of the exemplary embodiments of the invention which follows below an image pickup device having 32 rows of actual image pickup elements and adjacent thereto a separate shift register in each case will be assumed. The choice of said number of image pickup elements is, however, purely arbitrary and the principle of the invention can be used for any other number of rows of image pickup elements. The explanation will also be directed at only one single column of image pickup elements because the number of columns of image pickup elements in the image pickup device is not relevant and the operation of one column illustrates the operation of all the columns in the image pickup device. For the sake of clarity of the description, a number of the image pickup elements in column 1a in FIG. 1, viz. the image pickup elements 1, 16, 17, 24, 28, 30, 31 and 32 have been indicated by the relevant numeral.

Figure 2:
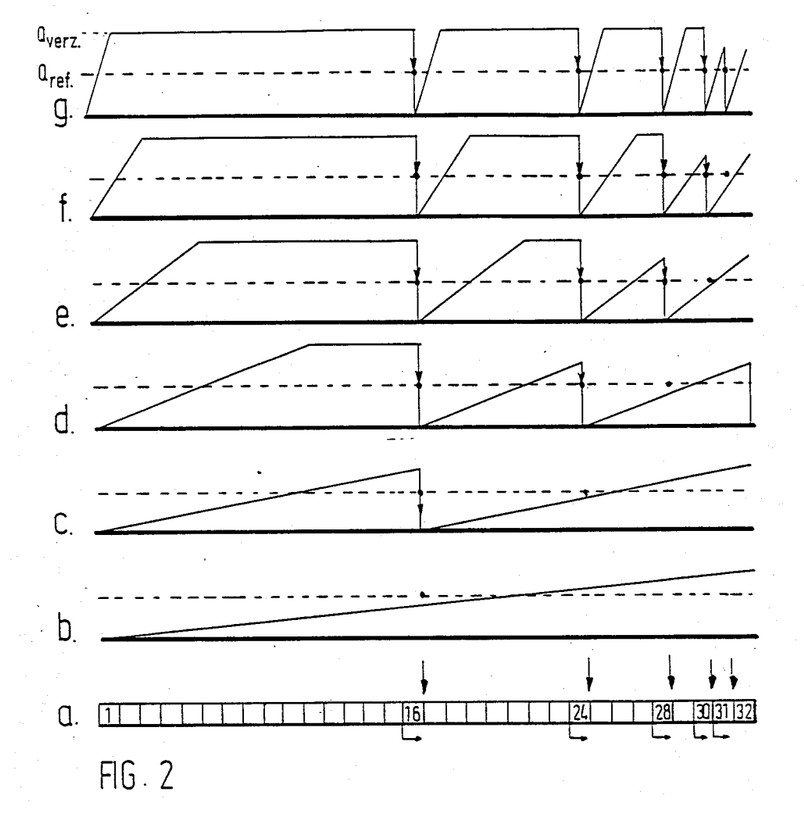
FIGS. 2a-g show a diagrammatic representation of the principle underlying the invention in the case of different exposure levels.

Before describing FIG. 1 further, the principle of the invention will first be explained on the basis of FIG. 2.

FIG. 2a shows very diagrammatically a column of 32 image pickup elements which is depicted horizontally in the drawing for the sake of clarity. FIGS. 2b to 2g incl. in each case reproduce the gradual increase of the charge in the consecutive image pick-up elements when said charge is shifted stepwise by means of the TDI principle from image pickup element 1 to image pickup element 32. In each of the FIGS. 2b to 2g incl., a reference charge $Q_{ref}$ and a saturation charge level $Q_{verz}$ are indicated. FIG. 2b indicates an amount of charge which is obtained as a result of a relatively low exposure level, accumulated charge at the end of the column not yet having reached the saturation level $Q_{verz}$ even in image pickup element 32. FIGS. 2c to 2g incl. then give consecutively examples in which the exposure level constantly becomes higher so that the accumulated charge reaches the saturation level increasingly more rapidly. In the column of image pickup elements according to FIG. 2a, a determination is made for predetermined image pickup elements of whether the accumulated charge up to and including said image pickup element exceeds the reference charge $Q_{ref}$. Said predetermined image pickup elements are, according to this example, the elements 16, 24, 28, 30 and 31, i.e. the column is divided up into lengths which increase in accordance with integral powers of the number 2.

Whenever it is detected for the predetermined image pickup elements that $Q \geq Q_{ref}$, where, for example, $Q_{ref} = \frac{1}{2} Q_{verz}$, the charge is removed and the accumulation of charge is completely restarted. As is evident from FIGS. 2b to 2g incl., the accumulated charge in image pickup element 32 is always less than $Q_{verz}$ regardless of the exposure level, while the number of times the charge is removed, once in FIG. 2c and five times in 2g provides the necessary information regarding the applicable scaling factor with which the actual exposure level can be reconstructed. In the example shown, the scaling factor is $2^k$, where k is equal to a number of times charge is removed.

Since, as a result of the TDI principle, the increase of the amount of charge proceeds linearly along the TDI column, it is known that, if charge removal is not necessary at the first check at element 16 because $Q<Q_{ref}=\frac{1}{2}Q_{verz}$, this will also not be necessary later because the total charge will then never be greater than $Q_{verz}$.

On the basis of FIGS. 3 and 4 an explanation will be given of the manner in which the principle according to the invention can be implemented in a TDI image pickup device.

Figure 3A:
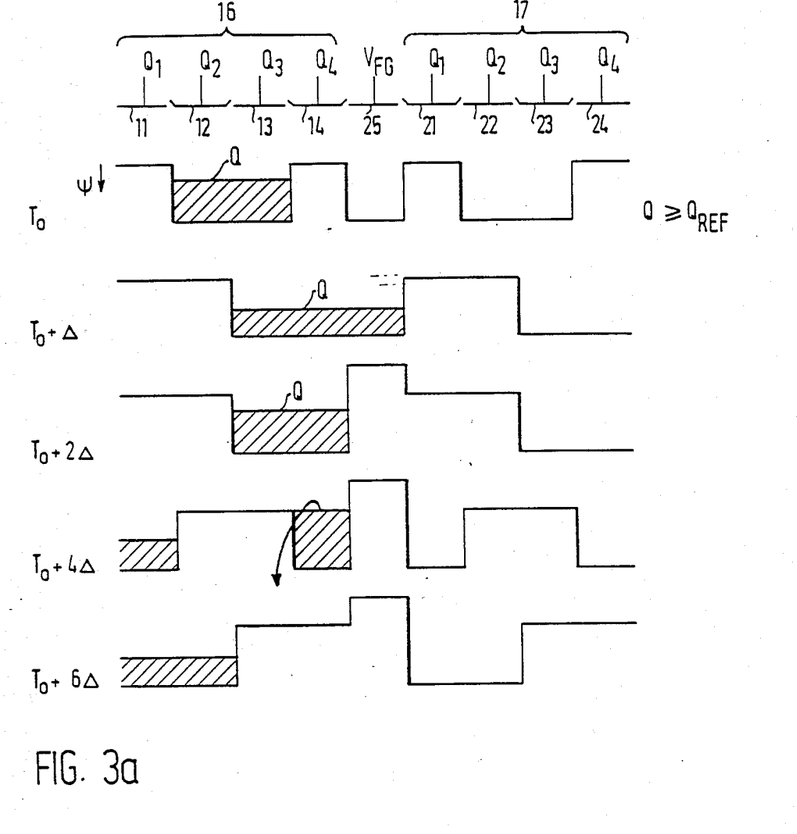
FIG. 3a shows the pattern of the surface potential profiles between two CCD shift register elements if charge removal has to take place.

FIG. 3a shows diagrammatically a section along the line III—III in FIG. 1, i.e. a cross-section of the CCD shift register 3a at the position of the image pickup elements 16 and 17. According to the exemplary embodiment, each CCD shift register element has four gate electrodes, 11, 12, 13, 14 and 21, 22, 23, 24 respectively for the elements 16 and 17, a floating gate electrode, such as electrode 25 between the CCD elements 16 and 17, always being provided adjacent to the CCD elements where a check takes place. Said floating gate electrode has a dual function, in the first place a sensor function in order to determine the amount of accumulated charge in CCD element 16 in a nondestructive manner and in the second place a logic function in which a determination is made of whether $Q<Q_{ref}$ or $Q\geq Q_{ref}$, where in the first case the charge is allowed through to the first gate electrode 21 of CCD element 17 and in the second case the charge is removed to an anti-blooming channel provided next to the TDI column and indicated diagrammatically in FIG. 1 with reference numeral 6. In order to prevent the charge transport under the control of the clock pulses taking longer in the case of an image pickup element where a check on the amount of charge takes place, such as in the case of element 16, than in the case of other image pickup elements as a result of the additional presence of the floating electrode in addition to the four gate electrodes present for each image pickup element, as a result of which an undesirable delay occurs in the charge transport, the combined lengths of the four gate electrodes 11 to 14 incl. and of the floating gate electrode 25 is preferably chosen so as to equal the combined length of, for example, the electrodes 21 to 24 incl. of CCD element 17. This shortening of the electrodes of CCD element 16 ensures that the total length of said CCD element is equal to that of the CCD elements where no check takes place so that the time needed for the charge transport is equal for all the CCD elements.

FIGS. 3a and b use the associated surface potential profiles for consecutive instants in time to show how the transport of charge takes place from CCD element 16 to CCD element 17 respectively in the case where $Q<Q_{ref}$ and how it takes place to the anti-blooming channel 6 in the case where $Q\geq Q_{ref}$, where $Q_{ref}=Q_{verz}/2$.

Figure 4:
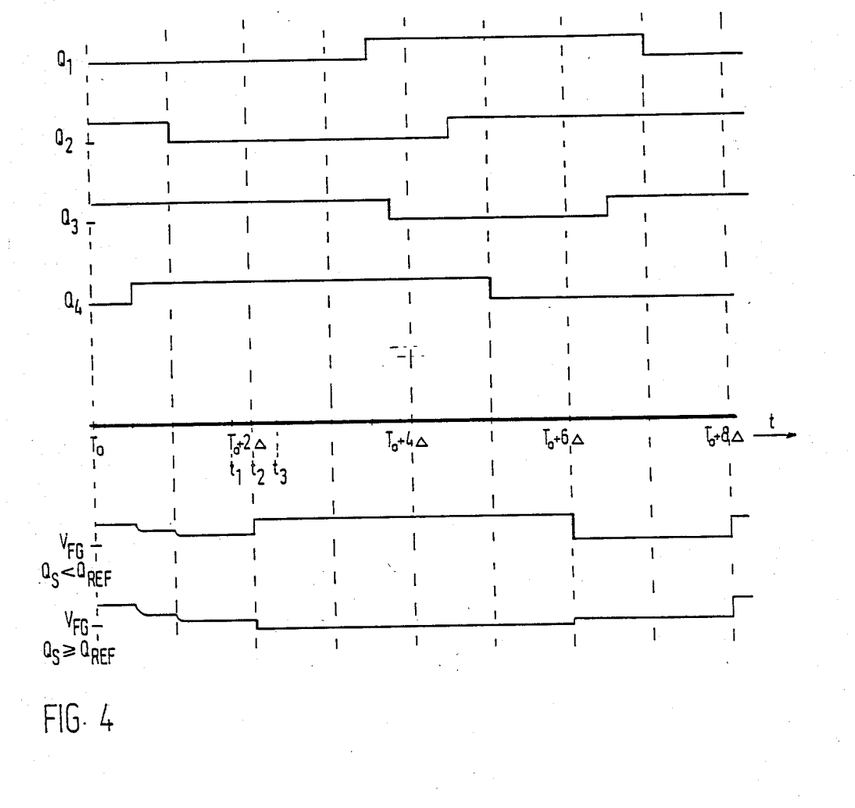
FIG. 4 shows the various clock potentials for operating the CCD shift register elements according to FIGS. 3a, b.

FIG. 4 shows the various clock signals $\phi_1$ to $\phi_4$ incl. which are fed during a clock signal cycle $T_0$ to the consecutive gate electrodes of the CCD elements. For the sake of clarity, the clock cycle $T_0$ is divided into eight subcycles $\Delta$. Under the time axis, FIG. 4 also shows the variation of the voltage at the floating gate electrode 25 for the case where $Q<Q_{ref}$ and for the case where $Q\geq Q_{ref}$.

The operation of the CCD elements 16 and 17 under the control of the clock pulses $\phi_1$ to $\phi_4$ incl. is based on a well-known principle that will not be explained in detail. The essence is based on the presence of the floating gate electrode 25 and the voltage $V_{FG}$ present thereon. First the situation will be described which is shown in FIG. 3a and for which it is assumed that $Q\geq Q_{ref}$, i.e. the charge present under a gate electrode of CCD element 16 is greater than the reference charge and therefore has to be removed according to the principle of the invention.

At the instant in time $T_0$, the charge Q is present under the electrodes 12 and 13, and at $T_0+\Delta$, it is present under the electrodes 13, 14 and 25. The gate electrode 25 is floating at said instant in time so that the charge present under said electrode ensures a drop in the potential $V_{FG}$ in accordance with the formula for a flat plate capacitor. At the instant in time $T_0+2\Delta$, a decision circuit indicated diagrammatically in FIG. 1 with reference numeral 9 is used to determine, on the basis of the voltage $V_{FG}$ and in a manner to be explained in more detail below, whether $Q\geq Q_{ref}$. If, as in the situation shown in FIG. 3a, this is the case, at the instant in time $T_0+2\Delta$, the connecting terminal of gate electrode 25 is set to a low potential, which potential is preferably a little lower than the low clock potential normally fed to the various gate electrodes of the CCD register. As a result of this, a potential threshold forms under electrode 25 and this prevents further transport of the charge Q to CCD element 17. At $T_0+4\Delta$, all the charge is located under gate electrode 14, excess charge flowing away to the anti-blooming channel 6. Finally, the gate electrode 14 is set to a low potential by means of the clock signals so that at $T_0+6\Delta$, all the charge Q has been removed to the anti-blooming channel 6. At this instant in time, a subsequent charge package is located under the electrodes 11 and 12 so that at the instant in time $T_0+8\Delta$, the cycle can restart. At $T_0+6\Delta$ a resetting of the connecting terminal of electrode 25 to a low potential takes place, which reset voltage is switched off at the instant in time $T_0+8\Delta$ so that the gate electrode 25 floats and the voltage $V_{FG}$ can again start to decrease as soon as charge can flow under the gate electrode 25 as a result of the clock signal $\phi_4$.

Figure 3B:
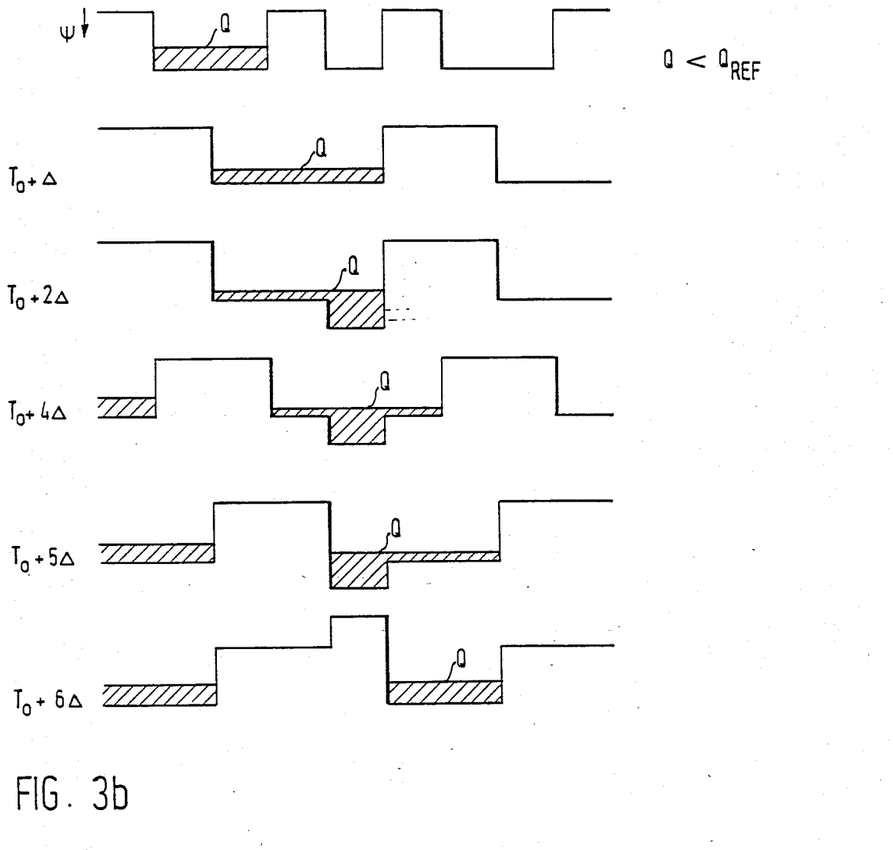
FIG. 3b is the same as FIG. 3a if no charge removal has to take place.

In the case where $Q<Q_{ref}$, which situation is shown in FIG. 3b, the same thing takes place at the instants in time $T_0$ and $T_0+\Delta$ as in the case of the situation shown in FIG. 3a. However, because Q is now $<Q_{ref}$, the decision circuit 9 detects on the basis of $V_{FG}$ that no charge removal needs to take place and at the instant in time $T_0+2\Delta$ a voltage is therefore applied to electrode 25 which is preferably somewhat higher than the normal high clock voltage applied to the electrodes of the CCD shift register so that it is certain that no charge remains behind under gate electrode 14. Between the instants in time $T_0+2\Delta$ and $T_0+5\Delta$, the charge Q is shifted to the potential wells under the electrode 25 and the gate electrodes 21 and 22 of the CCD element 17. At $T_0+6\Delta$, a low reset voltage is again applied to the gate electrode 25 so that the charge Q proceeds to be transported without any loss from CCD element 16 to CCD element 17 and from there can be shifted stepwise through the column of CCD elements to CCD element 24 where a check will again take place on the size of the charge Q which will occur yet again at the CCD elements 28, 30 and 31.

Because a check on the charge Q has to take place five times in a TDI column containing 32 CCD elements five decision circuits 9 ought to be necessary. Because an unnecessarily large amount of space is necessary for this, which is often not available on a semiconductor substrate, use is preferably made, as shown in FIG. 1, of a single decision circuit 9 which, by means of multiplexing consecutively via a data bus 9', reads out the voltages of the CCD elements 16, 24, 28, 30 and 31 by closing the diagrammatically reproduced switches 8a to 8e incl. consecutively for this purpose under the control of, for example, a shift register 10. Said shift register can be common to all the TDI columns on the semiconductor substrate. Because the clock frequency of the TDI column is, in general, relatively low, for example 4 kHz, adequate time is available for this multiplex reading out and a considerable reduction is achieved in the area needed on a semiconductor substrate.

Figure 5:
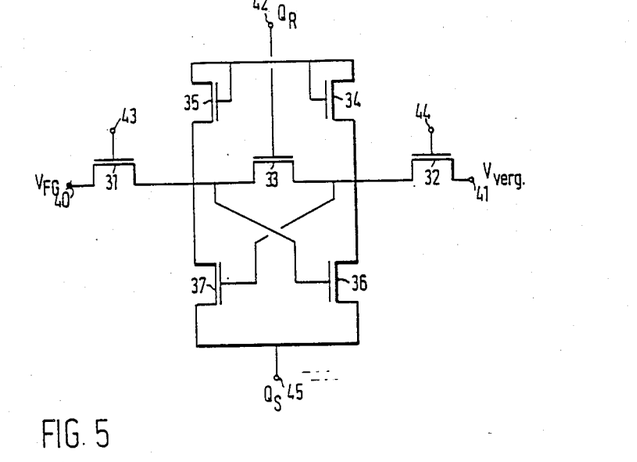
FIG. 5 shows a diagram of the decision circuit.

FIG. 5 shows a possible embodiment of the decision circuit 9, which circuit must therefore determine whether Q, the charge present in one of the CCD elements where a check on the charge takes place, is greater or smaller than the predetermined reference charge $Q_{ref}$. For this purpose, a voltage which is directly proportional to the charge Q is generated by means of a floating gate electrode such as electrode 25 in FIG. 3, while a fixed standard voltage $V_{verg}$ which is proportional to the predetermined $Q_{ref}$, is applied at the same time to the decision circuit.

If $V_{FG} \leq V_{verg}$, which means that too much charge is present under the floating gate electrode 25, the decision circuit has to emit an output signal which sets $V_{FG}$ to a low potential so as to form the potential threshold shown in FIG. 3a which prevents further charge transport.

If $V_{FG} > V_{verg}$, which corresponds to the situation shown in FIG. 3b, $V_{FG}$ has to be set to a high potential.

All this can be achieved with the circuit shown in FIG. 5, which comprises seven MOSFETs 31 to 37 incl. and six connecting terminals, 40 to 45 incl. FIG. 6a-c shows the voltages present at the connecting terminals 42 to 45 incl., while the voltages $V_{FG}$ and $V_{verg}$ are connected to the terminals 40 and 41 respectively. Set to the terminal 42 is a clock voltage $\phi_R$ whose variation is shown in FIG. 6a and which determines a reset cycle for setting the circuit to a quasistable state. During said reset cycle, the FET switches 31 and 32, to one electrode of which the input voltage $V_{FG}$ and the standard voltage $V_{verg}$ respectively are applied, are closed, which takes place as a result of applying to said gate electrodes a voltage $\phi_x$, the variation in which is shown in FIG. 6b. During said reset cycle, a resetting of all the voltages takes place in the complete circuit shown in FIG. 5, the internal nodes being charged up to a starting voltage.

After the completion of the reset cycle, the FET switches 31 and 32 are opened by increasing the voltage $\phi_x$. In the circuit, the voltages on the respective input terminals, i.e. $V_{FG}$ and $V_{verg}$ are now applied via the switches 31 and 32 to two of the electrodes of the MOSFET 33. Subsequently, the switches 31 and 32 are closed again by means of the voltage $\phi_x$ and, as shown in FIG. 6c, the voltage $\phi_s$ on terminal 45 is set to a low level. The circuit now assumes the active state and, depending on the relationship between $V_{FG}$ and $V_{verg}$, the voltages on the respective electrodes of MOSFET 33 are set to the high and to the low level or to the low and to the high level by the positive feedback via the MOSFETs 36 and 37 respectively. After the cycle in which this stable final state is reached, $\phi_x$ is again set to the high voltage level, as a result of which the terminals 40 and 41 take over the voltages on the respective electrodes of MOSFET 33. Under these circumstances, the voltage on terminal 40 determines the voltage of $V_{FG}$ during the cycle $T_0+2\Delta - T_0+6\Delta$ as is shown in FIG. 4.

Figure 6:
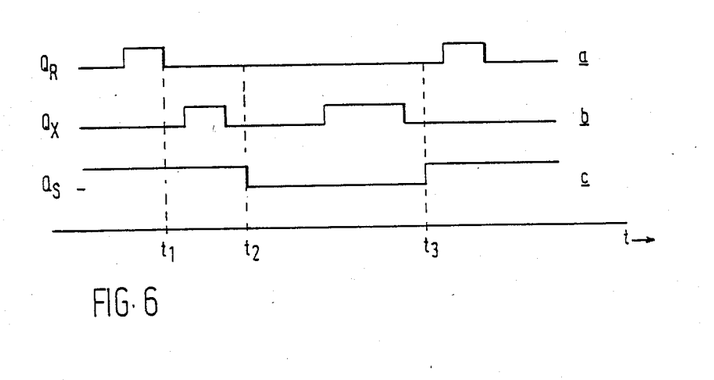
FIG. 6 shows the clock pulses occurring in the circuit according to FIG. 5.

The instants in time $t_1, t_2$ and $t_3$ shown in FIG. 6 correspond to the corresponding instants in time in FIG. 4, the actual decision taking place at the instant in time $t_2$.

In the case where $V_{FG} > V_{verg}$, which means that no voltage removal has to take place, a high-level voltage is produced in the circuit according to FIG. 5 on terminal 40 under the control of the clock pulses shown in FIGS. 6a-c, while a low-level voltage is produced on terminal 40 as soon as $V_{FG} \leq V_{verg}$ and charge removal therefore does have to take place. For a detailed description of the circuit shown in FIG. 5, reference may be made to "Charge-Coupled Devices and Systems" by M. J. Howes and D. V. Morgan, published by John Wiley & Sons, in particular to pages 186-189.

If one TDI column or, more particularly in practice, a number of parallel TDI columns are operated in the manner described above, the maximum permissible exposure level for a check at k positions along the column is larger than if no check takes place. As is clearly evident from FIG. 2, the total exposure range is therefore divided into k+1 regions, according to FIG. 2 six regions, viz. always the region most to the right in the drawing in FIGS. 2b to 2g incl. respectively, the signal which is finally removed at the end of the TDI column in each exposure region being proportional to the light level in that region, but differences in light levels between the various exposure level regions being no longer recognizable. In this manner, image equalization is obtained which is very useful for certain applications. For other applications, however, it is desirable to obtain information over the entire exposure level, which makes an X-ray image with a large contrast range possible. For this purpose, it is necessary to keep an account of the section of the TDI column over which the charge has accumulated which reaches the horizontal shift register. A measure of this is the number of times the information, i.e. the charge, is removed as a result of the exposure by a particular image point during the charge transport along the TDI column. The said number of times charge is removed will hereinafter be termed the removal factor.

It is clear that an account of the removal factor can be kept by means of an external computer outside the semiconductor substrate in which the image pickup device is located, but it is preferable to provide the necessary facilities for this purpose on the same semiconductor substrate as the image pickup device.

Figure 7:
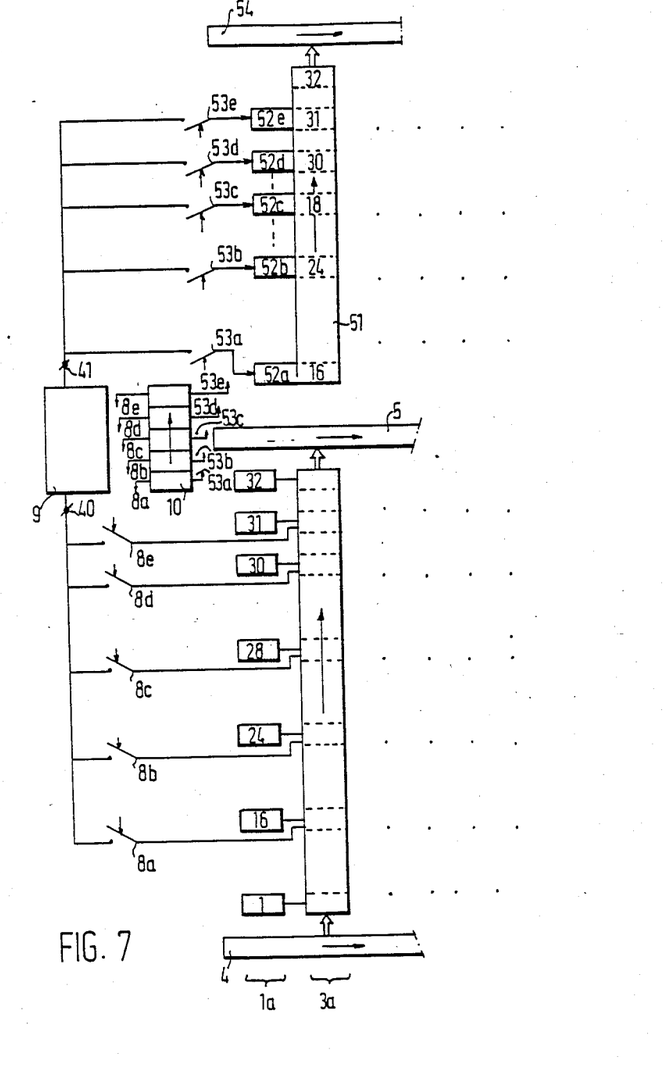
FIG. 7 shows a section of the device according to FIG. 1 provided with a CCD scaling factor shift register.

For this purpose it is possible to provide a separate CCD shift register in each case next to each CCD shift register such as register 3a in FIG. 1, in which register an account is kept of the information relating to the removal factor. However, this means a relatively large distance between the consecutive columns of image pickup elements, which is less desirable. A better solution is shown in FIG. 7, in which the same reference numerals have been used as in FIG. 1 for corresponding components. For each column of image pickup elements, such as the columns 1a and 3a, a CCD removal factor shift register 51, which is situated at the top or bottom thereof or in the semiconductor substrate and which will hereinafter be termed the removal factor register, is now provided in each case. For 32 image pickup elements, the removal factor register has 17 elements because no check has to take place in the case of the image pickup elements 1-15 and therefore no account has to be kept of the removal factor. For the sake of clarity, the elements in the removal register have the same serial number as the corresponding elements in the TDI column. Charge can be injected in the removal factor register at the CCD elements 16, 24, 28, 30 and 31, which is diagrammatically shown by means of the blocks 52a to e incl. Each of the charge injection points has a control connection to the switches 53a to e inclusive which are under the control of the shift register 10. If a position in the shift register closes the associated switch, connecting terminal 41 of the decision circuit 9 is coupled to the appropriate CCD element and the signal present on terminal 41 determines whether or not charge has to be injected from the injection sources 52a-e into said CCD element. By always injecting charge into the removal factor register 51 if charge is removed in the case of the corresponding element in the CCD column 3a, an account is kept in the scaling factor register of how many times in total charge has been removed, which information can be read out at the top of said shift register, just as in the case of the CCD shift register 3, via a horizontal CCD shift register 54. As a result of this, not only is a symmetrical structure obtained, but the result is also achieved that the columns of image pickup elements and the scaling factor registers can be controlled with the same clock signals.

Two of the many possible embodiments for operating the scaling factor register will be explained in more detail below.

Figure 8:
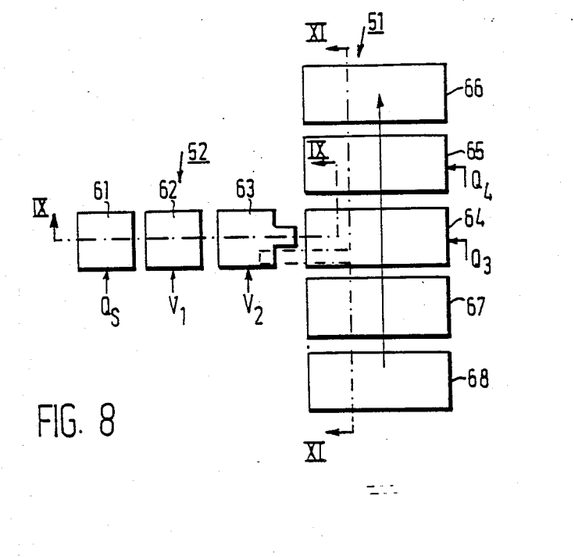
FIG. 8 shows a plan view of a CCD element of the scaling factor shift register.
Figure 9:
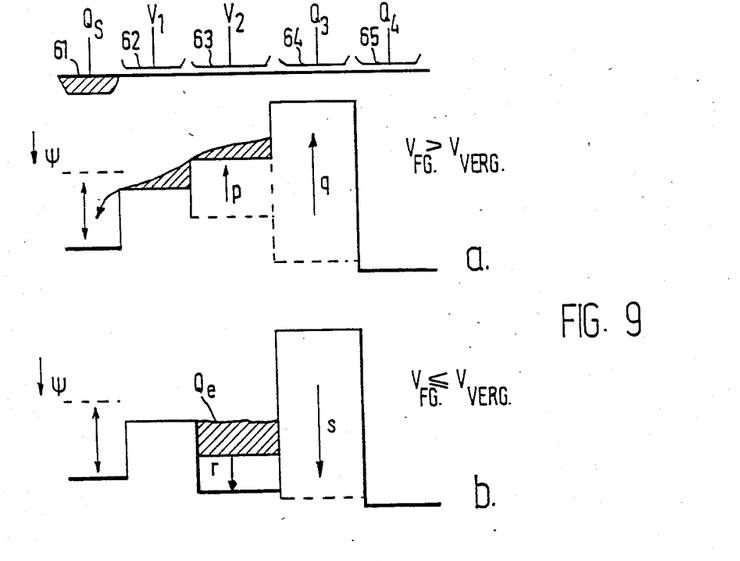
FIGS. 9a-b show a cross-section along the line IX—IX in FIG. 8 with the associated surface potential profiles.
Figure 10:
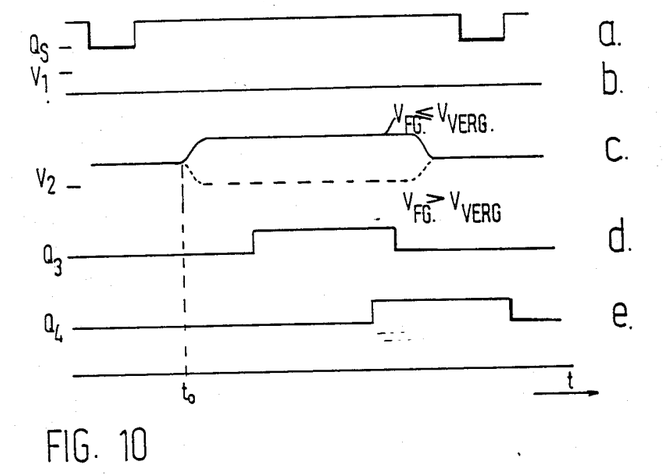
FIGS. 10a-e show the clock pulses which are necessary for operating the CCD elements according to FIGS. 8, 9 and 11.

For the first example, reference is made to FIGS. 8, 9 and 10.

FIG. 8 shows more precisely a plan view of the structure of one CCD element of the scaling factor register 51 in FIG. 7 and the charge injection mechanism 52 associated therewith, while FIG. 9 diagrammatically shows a section along the line IX—IX in FIG. 8 together with a diagrammatic reproduction of the surface potential profiles which occur under the influence of clock pulses.

Every time one of the switches 53a to e incl. is closed under the control of the shift register 10, a unit charge $Q_e$ is transported under the control of a clock pulse $\phi_s$ which may be the same clock pulse as the clock pulse $\phi_s$ in FIG. 6a, from a diffusion region 61 via the potential threshold present under gate electrode 62 as a consequence of a constant low bias voltage $V_1$ applied thereto, to a position under electrode 63. The choice of the amount of charge which is represented by $Q_e$ may, for example, be such that it corresponds to $Q_{verz}/k$, $Q_{verz}$ being equal to a completely filled charge well under one of the gate electrodes of a CCD element in the column of image pickup elements, such as, for example, element 16 in FIG. 3. Because the clock signals usually have an equal positive and negative level for all the gate electrodes in the column of image pickup elements, the magnitude of the maximum content of a charge well, i.e. the magnitude of $Q_{verz}$ is also equal for all the gate electrodes.

The voltage $V_2$ on electrode 63 is initially determined by a bias voltage but at the instant in time $T_0$, said bias voltage is switched off and electrode 63 is allowed to float. The voltage formed on the connecting terminal of said electrode as a consequence of the charge $Q_e$ now forms the standard voltage $V_{verg}$ and this is fed to terminal 41 of the decision circuit 9.

In the manner already explained above on the basis of FIGS. 5 and 6, said decision circuit now ensures that the terminal 40 assumes a positive voltage level, and this means, as has also already been explained, that no charge removal should take place, a negative voltage being applied at the same time to terminal 41 which is connected to the gate electrode 63. Said negative voltage ensures that, as is indicated in FIG. 9a by the arrow p, a potential threshold is formed under electrode 63, as a result of which the unit charge flows back to the diffusion region under the electrode 61. The unit charge cannot flow away to a position under electrode 64 because, as is indicated in FIG. 9a by the arrow q, a potential threshold has formed at that instant under said electrode under the control of the clock voltage $\phi_3$.

In the case where the voltage on terminal 40 is less than $V_{verg}$ and therefore $Q \leq Q_{verz}/2$, a negative voltage is applied to terminal 40 so that charge removal can occur and further transport of said charge along the column of image pickup elements is prevented, a positive voltage being applied to terminal 41. As a result of this, the unit charge $Q_e$ can be transported under the control of the clock pulses $\phi_3$ and $\phi_4$ to a position under electrode 65 in the scaling factor register. The reason is that, as a result of the positive voltage on terminal 41, a potential well forms under electrode 63, and this is indicated in FIG. 9b by the arrow r, a potential well subsequently forms under electrode 64 under the control of the clock pulse $\phi_3$, this being indicated by the arrow s, as a result of which the charge can flow from under electrode 63 to a position under electrode 64 and subsequently under the control of clock pulse $\phi_4$ to a position under electrode 65. In this manner an account can elegantly be kept of whether and how many times charge removal takes place.

In the case of the scaling factor register 51, a facility must also be provided to detect whether charge was also removed during the preceding check every time a check takes place on the charge in the column of image pickup elements. The reason is that, as can be deduced from FIG. 2, no charge removal must take place unless charge was also removed during the preceding checks. That is to say, as soon as a test position has been passed without charge removal, the latter can no longer take place further on at the subsequent check positions.

This information can obviously be deduced from the actual content of the scaling factor register, but it can also be deduced by means of a separate flag bit register, for example a CCD register, which runs in parallel with the scaling factor register and in which a change in the sign of the flag bit indicates that no charge removal has taken place so that this must also be prevented in the case of the subsequent check positions. For this purpose, the flag bit can be used, for example, to reduce the level of $V_{verg}$ in a manner such that the circuit 9 cannot decide in favour of further charge removal. The flag bit can also be supplied directly as a bias voltage to circuit 9 in order to prevent the latter applying a negative voltage to terminal 40.

The second example of the scaling factor register will be discussed below on the basis of FIG. 11, which shows a section along the line XI—XI in FIG. 8 and also the various surface potential profiles which occur under the influence of the clock signals, and it will be evident that, in this case, not even a flag bit register is any longer necessary.

The voltage on the floating gate electrode 63 as a consequence of a charge $Q_e$ is now not chosen as the standard potential, but the potential as a consequence of an empty potential well under electrode 63, this being shown diagrammatically in FIG. 11a, and said voltage $V_{verg}$ is again compared with the voltage $V_{FG}$ on terminal 40 of the decision circuit 9. Two situations are now possible.

$V_{FG} \leq V_{verg}$, which means that charge removal has to take place. The decision circuit 9 now applies a low voltage to terminal 40 and a high voltage to terminal 41, as a result of which the surface potential of electrode 63 increases, and this is shown diagrammatically in FIG. 11b by the arrow b. In the case of the subsequent check, $V_{verg}$ will again be equal to the surface potential as a consequence of an empty well under electrode 63 so that a comparison can again be made and charge can possibly be removed. No charge is now supplied under electrode 64 of the scaling factor register 51, this being in contrast to the situation in the case of the embodiment according to FIG. 10.

$V_{FG} > V_{verg}$. No charge removal now takes place and this must also no longer take place at any subsequent check positions. The decision circuit 9 now generates a low voltage on terminal 41 and therefore on electrode 63, this being indicated diagrammatically in FIG. 11c by the arrow c, as a result of which charge can flow from the scaling factor register 51 from under electrode 63 to a position under electrode 64. This charge is transported in the usual manner by the register 51 in the column direction. At the subsequent check position, where electrodes 63, 64 and 65 are again provided, this charge will be able to flow under the influence of the clock pulses to a position under the electrode 63 at the site of the check position in the case of the factor register, as a result of which $V_{verg}$ decreases and the decision circuit 9 will therefore no longer decide in favour of charge removal. According to the same principle, an additional amount of charge will now be produced again under electrode 64 in the factor register so that charge removal is also prevented at later check positions because $V_{verg}$ always decreases to a lower level. At the end of the removal factor register 51, it is possible to determine, on the basis of the amount of charge present in said register, how many times charge removal has taken place.

Figure 11:
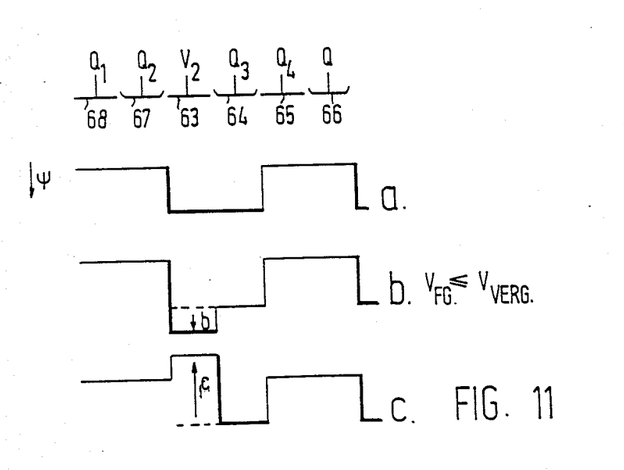
FIGS. 11a-c show a section along the line XI—XI in FIG. 8 with the associated surface potential profiles.

In the case of the embodiment according to FIG. 11 it is obviously necessary to provide, in addition to the removal factor register, a facility for making it possible to inject a charge under the electrode 63 if $V_{verg}$ assumes a low level as a consequence of the voltage applied by decision circuit 9 to terminal 41. Such a mechanism is easy to achieve in an integrated circuit and does not require any further explanation.

Although an image pickup device has been described above which has a column of 32 image pickup elements and which is divided into sections with an ever increasing number of image pickup elements, which increase progresses according to consecutive powers of two, the invention is by no means limited thereto.

Any column of image pickup elements in which the total number $m = n^k$, where n is an integer, n being $\geq 2$, and where k is an integer, k being $\geq 1$, can be divided into k sections of image pickup elements, the ever increasing number of image pickup elements per section being determined by the $n^p + 1$, where p is an integer, p being $\geq 0$. It is also possible to allow the smallest section to consist not of one image pickup element but of q image pickup elements, q being $\geq 1$. The number of image pickup elements per section is then $qn^p + 1$. As will be clear from the above explanation, the sections overlap each other and each section terminates at the image pickup element 32 in the column. For clarification, the starting point in FIG. 2 of each of the sections, five in the case shown there, is indicated diagrammatically by an arrow directed towards image pickup element 32. In general, the decision is taken at predetermined check-points along such a column of image pickup elements to remove charge if $$Q \geq \frac{n-1}{n} Q_{verz}$$

and to transport it further along the column if $$Q < \frac{n-1}{n} Q_{verz}.$$

The increase in dynamic range obtained with a column of image pickup elements equipped according to the invention is always $n^k$. Thus, in a column containing $m = 100$ image pickup elements, in which $n = 10$ and $k = 2$, a check on the quantity of charge can take place after 90 and 99 image pickup elements, with an increase in dynamic range of $10^2 = 100$.

With all these possible column lengths it is optionally possible to keep an account of how many times charge removal takes place. If no account is kept of this, as has been explained above, image equalization is obtained.

In addition to a potential charge removal at predetermined fixed positions along a column of image pickup elements, it is also possible to remove charge only if the charge saturation level is reached at an arbitrary image pickup element in the column. In order to be able to determine a removal factor at the end of the column of image pickup elements, it is then necessary to detect how many active image pickup elements are still traversed after the charge removal, it being necessary to restart this counting after each charge removal.

An advantage of this is that no comparison with a reference charge needs to take place.

It will be clear that it is possible, according to the principle of the invention, to operate an image pickup device which employs the TDI principle much more efficiently than was possible hitherto because an appreciable increase in the dynamic range of the X-ray image obtained can be achieved in a relatively simple manner or image equalization can be obtained in a very simple manner in an X-ray image with a large dynamic range.

I claim:

1. Image pickup device comprising a matrix having horizontal rows and vertical columns of image pickup elements, means for supplying clock signals to said matrix of image pickup elements to shift image information in a column direction in time-delay-and-integration mode, and means for repeatedly reading said image information out of a column, which comprises means for determining amount of charge stored in predetermined image pickup elements in a column and means for removing said charge in only said predetermined image pickup elements of said column when said detected amount exceeds a predetermined limit value.

2. Image pickup device according to claim 1 wherein said predetermined limit value of said amount of charge is less than an amount of charge of saturation of said image pickup elements.

3. Image pickup element according to claims 1 or 2 wherein said column of image pickup elements comprises k sections of image pickup elements, where k is an integer, k being $\geq 1$, a last image pickup element in each section being formed by the image pickup element in the column situated nearest said means of reading out wherein a total number of image pickup elements in a column is equal to m, where $m=n^k$, where n is an integer, n being $\geq 2$ and length of said sections is determined by $n^p+1$, where p is an integer, $p \geq 0$.

4. Image pickup device according to claim 3 wherein a smallest section comprises q image pickup elements, q being $\geq 1$.

5. Image pickup device according to claim 4 wherein $m=32$, $n=2$ and $q=1$.

6. Image pickup device according to claim 3 wherein a first image pickup element of each section of image pickup elements is coupled to a decision circuit equipped to compare amount of charge present in said image pickup element with a reference charge.

7. Image pickup device according to claim 6 wherein for one column of image pickup elements, one single decision circuit is provided and means are provided for coupling the decision circuit consecutively with each of said image pickup elements at a beginning of a section.

8. Image pickup device according to claim 7 wherein adjacent to each of said image pickup elements at a beginning of a section there is provided a gate electrode coupled to said decision circuit, said gate electrode floating during a section of a clock signal cycle.

9. Image pickup element according to claim 8 wherein low voltage is applied to said gate electrode if said decision circuit detects charge removal and a high potential if said decision circuit detects no charge removal.

10. Image pickup device according to claim 6 and further including a CCD removal factor shift register for each column of image pickup elements and means for keeping an account in said shift register of frequency of charge removal at specified sites along said column of image pickup elements.

11. Image pickup device according to claim 10 wherein said number of elements in said CCD removal factor shift register is at least equal to said largest section.

12. Image pickup device according to claim 10 wherein said CCD shift register is provided at positions corresponding to predetermined positions along said column of image pickup elements and further including means for injecting charge into said shift register wherein each of said charge injection means can be coupled to an input terminal of said decision circuit at an instant in time when a check on amount of charge takes place at a corresponding image pickup element along said column of image pickup elements.

13. Image pickup device according to claim 12 wherein charge injection takes place if, for a corresponding image pickup element along said column, said decision circuit detects a quantity of charge stored in said element greater than said reference charge.

14. Image pickup device according to claim 12 wherein said means for injecting charge comprise a diffusion region, a gate electrode adjoining said diffusion region and connected to a fixed bias voltage, and a further gate electrode situated between said gate electrode and said shift register coupled to said decision circuit.

15. Image pickup device according to claim 14 and further including means for preventing a decision to be made by said decision circuit in favour of charge removal for a specified image pickup element if a preceding specified image pickup element viewed in charge shift direction in said column said decision circuit detected no charge removal.

16. Image pickup device according to claim 12 wherein said means for removing charge comprises at least a gate electrode coupled to an input terminal of said decision circuit and injection of charge into said shift register takes place if, in the case of the corresponding specified image pickup element along said column said decision circuit detects no charge removal.

17. Image pickup device according to claim 6 wherein adjacent to each of said image pickup elements at a beginning of a section there is provided a gate electrode coupled to said decision circuit, said gate electrode floating during a section of a clock signal cycle.

18. Image pickup device according to claim 3 and further including a CCD removal factor shift register for each column of image pickup elements and means for keeping an account in said shift register of frequency of charge removal at specified sites along said column of image pickup elements.

19. Image pickup device according to claim 13 wherein said means for injecting charge comprise a diffusion region, a gate electrode adjoining said diffusion region and connected to a fixed bias voltage, and a further gate electrode situated between said gate electrode and said shift register coupled to said decision circuit.

* * * * *

UNITED STATES PATENT AND TRADEMARK OFFICE
CERTIFICATE OF CORRECTION

PATENT NO. : 4,893,186
DATED : JANUARY 9, 1990
INVENTOR(S) : HENDRIK MULDER

It is certified that error appears in the above-identified patent and that said Letters Patent is hereby corrected as shown below:

ON TITLE PAGE:   Item [73]   Assignee should read as follows:

-- B.V. Optische Industrie "De Oude Delft",
      Delft, Netherlands --

Signed and Sealed this

Thirty-first Day of March, 1992

Attest:

HARRY F. MANBECK, JR.

Attesting Officer

Commissioner of Patents and Trademarks